US009641205B1

(12) United States Patent
Hyun et al.

(10) Patent No.: US 9,641,205 B1
(45) Date of Patent: May 2, 2017

(54) ACTIVE INTERFERENCE CANCELLATION

(71) Applicant: Amazon Technologies, Inc., Seattle, WA (US)

(72) Inventors: In Chul Hyun, San Jose, CA (US); Sembhayya Gollakota, Sunnyvale, CA (US); Morris Hsu, Santa Clara, CA (US); Cheol Su Kim, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/848,215

(22) Filed: Sep. 8, 2015

(51) Int. Cl.
| H04B 1/04 | (2006.01) |
| H01Q 1/52 | (2006.01) |
| H04W 88/06 | (2009.01) |
| H04W 84/12 | (2009.01) |
| H04W 4/00 | (2009.01) |

(52) U.S. Cl.
CPC ......... H04B 1/0475 (2013.01); H01Q 1/525 (2013.01); H04W 4/008 (2013.01); H04W 84/12 (2013.01); H04W 88/06 (2013.01)

(58) Field of Classification Search
CPC ...... H04B 1/0475; H01C 1/525; H04W 88/06
See application file for complete search history.

(56) References Cited

U.S. PATENT DOCUMENTS

| 5,117,505 A * | 5/1992 | Talwar | H04B 1/126 343/853 |
| 5,548,838 A | 8/1996 | Talwar et al. | |
| 5,729,829 A * | 3/1998 | Talwar | H04B 7/005 455/296 |
| 8,036,606 B2 | 10/2011 | Kenington | |
| 2004/0106381 A1* | 6/2004 | Tiller | H04B 17/11 455/73 |
| 2006/0291598 A1* | 12/2006 | Gebara | H01Q 1/521 375/346 |

(Continued)

OTHER PUBLICATIONS

J.D.A. van den Broek et al., "A Self-Interference Cancelling Receiver for In-Band Full-Duplex Wireless with Low Distortion under Cancellation of Strong TX leakage" http://doc.utwente.nl/95677/1/ISSCC2015_Van_den_Broek.pdf, retrieved on Sep. 28, 2015.

(Continued)

Primary Examiner — Gennadiy Tsvey
(74) Attorney, Agent, or Firm — Lowenstein Sandler LLP

(57) ABSTRACT

Antenna structures and methods of operating the same are described. One apparatus includes a processing device that executes an active interference cancellation (AIC) algorithm and radio frequency front-end (RFFE) circuitry coupled to the processing device. The RFFE circuitry includes two RF couplers, and a programmable-delay filter and a vector modulator disposed along electrical path. The AIC algorithm is operable to control the programmable-delay filter to match a delay of the electrical path to a propagation delay in an antenna path. The AIC algorithm is operable to control the vector modulator to adjust a phase, an amplitude or both of a copy of a first RF signal transmitted via the first antenna to generate a second RF signal. The second RF signal is added to a third RF signal via the second RF coupler to remove from the third RF signal interference caused by the first RF signal.

16 Claims, 10 Drawing Sheets

(56) References Cited

U.S. PATENT DOCUMENTS

| | | | | |
|---|---|---|---|---|
| 2007/0060059 A1* | 3/2007 | Kim | ............... | H04B 1/7103 |
| | | | | 455/63.1 |
| 2009/0088201 A1* | 4/2009 | Kousai | ............... | H04B 1/525 |
| | | | | 455/552.1 |
| 2010/0197231 A1* | 8/2010 | Kenington | ............ | H04B 1/525 |
| | | | | 455/63.1 |

OTHER PUBLICATIONS

Jain, Mayank et al. "Practical, real-time, full duplex wireless." Proceedings of the 17th Annual International Conference on Mobile Computing and Networking (Mobicom Sep. 19-23, 2011).

Jung Il Choi et al. "Full Duplex Wireless System." download available via web page at http://sing.stanford.edu/fullduplex/, downloaded Jun. 30, 2015.

Choi, J. I., Jain, M., Srinivasan, K., Levis, P., & Katti, S. (Sep. 2010). Achieving single channel, full duplex wireless communication. In Proceedings of the sixteenth annual international conference on Mobile computing and networking (pp. 1-12). ACM.

* cited by examiner

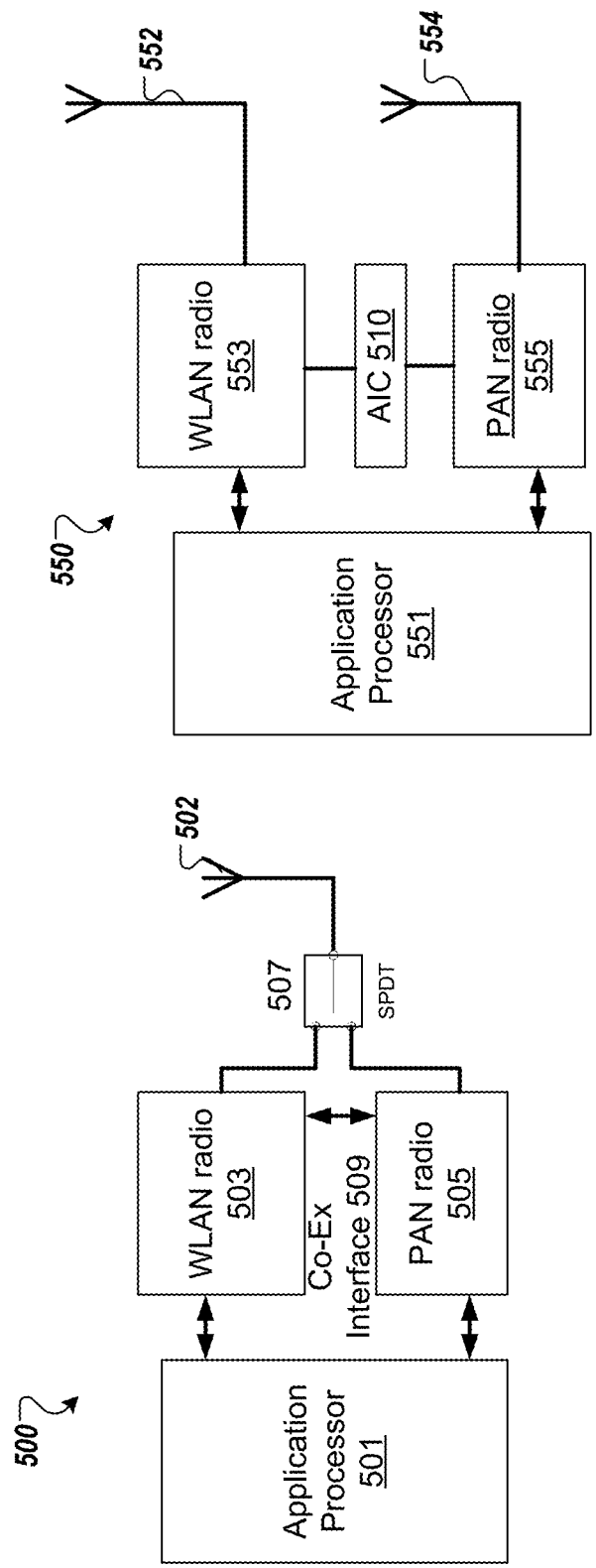

ACTIVE INTERFERENCE CANCELLATION

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 5A is a block diagram of a conventional time-switched radio architecture.

FIG. 5B is a block diagram of a radio architecture for simultaneous operation using AIC according to a conventional solution.

DETAILED DESCRIPTION

Figure 1:
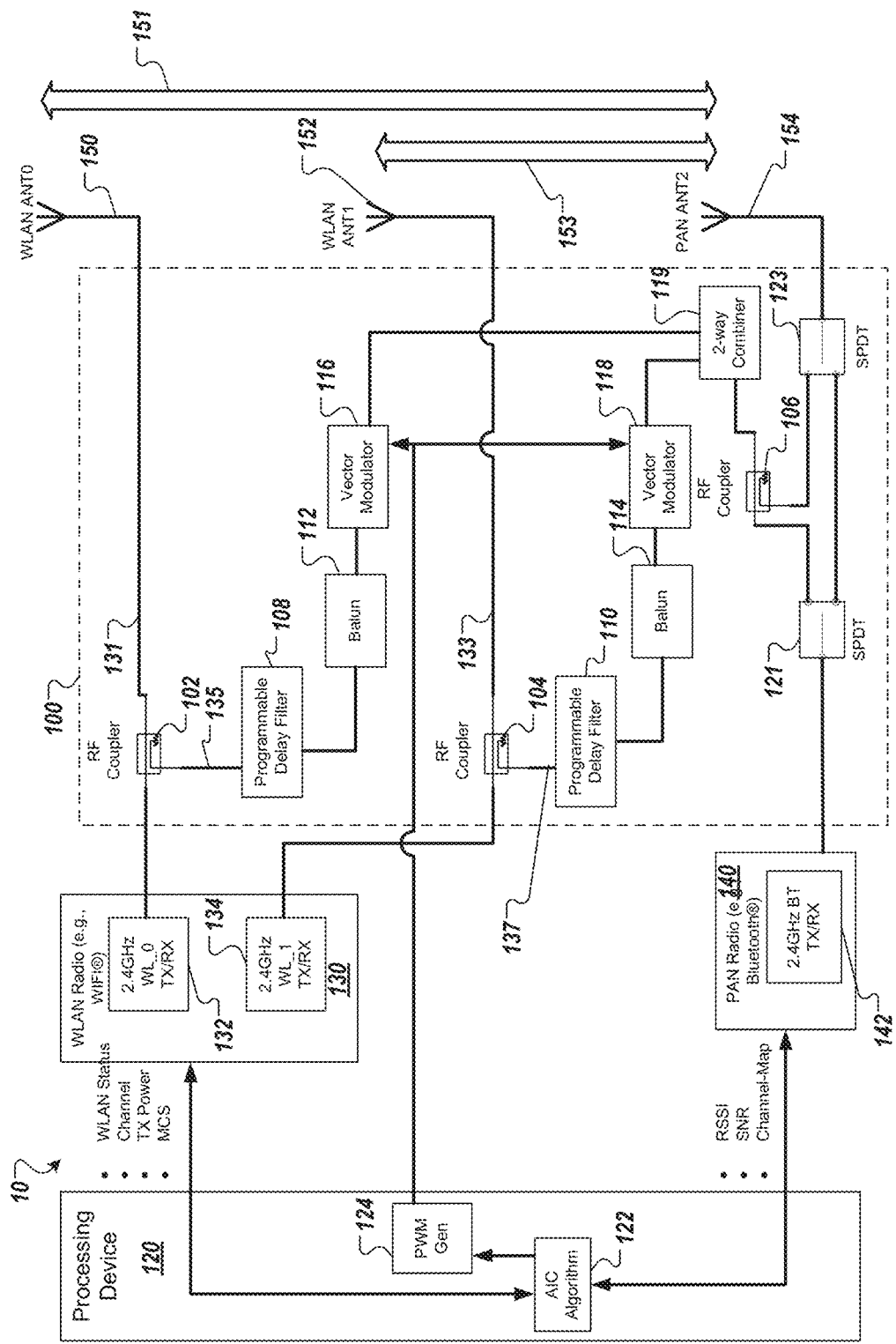
FIG. 1 is a block diagram of radio frequency front-end (RFFE) circuitry for active interference cancellation (AIC) according to one embodiment.

Antenna structures and methods of operating the same are described. One apparatus includes a processing device that executes an active interference cancellation (AIC) algorithm and radio frequency front-end (RFFE) circuitry coupled to the processing device. The RFFE circuitry includes a first RF coupler, a second RF coupler, a cancellation path, a programmable-delay filter, and a vector modulator. The first RF coupler is coupled between a first antenna and a first transceiver in a transmit path. The second RF coupler is coupled between a second antenna and a second transceiver in a receive path. The cancellation path is coupled between the first RF coupler and the second RF coupler. The programmable-delay filter is disposed along the cancellation path between the first RF coupler and the second RF coupler. The vector modulator is disposed along the cancellation path between the first RF coupler and the second RF coupler. The AIC algorithm is operable to control the programmable-delay filter to match a delay in the cancellation path to a propagation delay in an antenna path. The AIC algorithm is operable to control the vector modulator to adjust a phase, an amplitude or both of a copy of a first RF signal transmitted via the first antenna to generate a second RF signal. The second RF signal is added to a third RF signal via the second RF coupler to remove from the third RF signal interference caused by the first RF signal. The second RF signal is removed from the third RF signal using destructive interference when the phase, amplitude, and delay are adjusted appropriately using the AIC techniques described herein.

The 2.4 GHz industrial, scientific and medical (ISM) radio band allows unlicensed wireless communications. Due to its unlicensed nature, many short ranged, low power wireless communication systems operate in this frequency band. Since these radios occupy the same spectrum, careful designs are required to prevent interference between one another, often at the cost of reduced throughput or range for the radios. To support multiple radios operating in the same frequency band on compact devices, the conventional implementations use time-switched architectures, such as illustrated in FIG. 5A. In this architecture, a single radio can transmit or receive at any given time, and there is no performance degradation due to inter-radio interference during this time slot. However, it has poor data throughput and higher latency because of the need to switch between the two radios. In order to improve spectrum usage, to reduce latency, and to increase data throughput, there is a rising interest to implement simultaneous operation architecture, as described herein and depicted in FIG. 5B to compare to the architecture illustrated in FIG. 5A. For multi-user multiple-input multiple-output (MU-MIMO) antenna system, two to eight antennas may be used to achieve data rates up to several Gbits/s. However, antennas using different technologies may need separate antennas. For example, the system may include one antenna using the Bluetooth® technology for 2.4 GHz BT-LE and another antenna using the Zigbee® technology for 2.4 GHz. Traditionally, these antennas need to be separated in space or time-division multiplexed during operation. For another example, the system may include one antenna using Wi-Fi® technology for 2.4 GHz and another antenna using the Bluetooth® technology for 2.4 GHz BT-LE. Similarly, these antennas need to be separated in space or time-divisional multiplexed during operation.

In the architectures of the embodiments described herein, both radios (e.g., WLAN and PAN radios) can transmit and receive simultaneously. However, since both radios are on at the same time, one system's transmit signal will present itself as unwanted signal at the other system's receiver, causing interference. Because of this interference, the operable range may be reduced. To maximize the operable range, an isolation of at least 60 dB is desired between the two radios' antennas. However, this isolation is difficult to achieve in compact consumer electronics. For example, stronger receive power is needed to achieve high data rate with wireless local area network (WLAN) antennas, e.g., antennas using the Wi-Fi® technology using IEEE 802.11ac standard. For example, to achieve a data rate of 400 Mbit/s using 80 MHz bandwidth, received powers of the order of −60 dBm are needed. As described herein, radio frequency front end (RFFE) circuitry and the Active Interference Cancellation (AIC) techniques can be used to reduce or remove interference in these simultaneous operation architectures.

The antenna structures described herein can be used for wireless local area network (WLAN) technologies (e.g., Wi-Fi® technologies), personal area network (PAN) technologies (e.g., Bluetooth® and Zigbee® technologies), wireless area network (WAN) technologies, such as cellular technologies including Long Term Evolution (LTE) frequency bands, third generation (3G) frequency bands, global navigation satellite system (GNSS) frequency bands (e.g., positioning system (GPS) frequency bands, or the like.

FIG. 1 is a block diagram of radio frequency front-end (RFFE) circuitry 100 for active interference cancellation (AIC) according to one embodiment. The RFEE circuitry 100 may reside in an electronic device 10, such as a portable electronic device as described herein. The RFFE circuitry 100 is coupled to a processing device 120, a wireless local area network (WLAN) radio 130 (also referred to as WLAN module), a personal area network (PAN) 140 radio (also referred to as PAN module), a first WLAN antenna 150, a second WLAN antenna 152, and a PAN antenna 154. The RFFE circuitry 100 includes a first RF coupler 102, a second RF coupler 104, a third RF coupler 106, a first programmable-delay filter 108, a second programmable-delay filter 110, a first balun 112, a second balun 114, a first vector modulator 116, a second vector modulator 118, and a two-way combiner 119. The first RF coupler 102 is coupled between the first WLAN antenna 150 and a first transceiver 132 of the WLAN radio 130. The first transceiver 132 of the WLAN radio 130 can transmit or receive RF signals via the first WLAN antenna 150. When transmitting a transmit signal by the first transceiver 132 on a transmit path 131, the first RF coupler 102 creates a copy of the transmit signal on a first cancellation path 135. The cancellation path 135 is an electrical path with one or more components used to adjust a delay, phase, amplitude, or any combination thereof of a copy of an RF signal from the first transceiver 132. In one embodiment, disposed along the first cancellation path 135 are the first programmable-delay filter 108, the first balun 112, and first vector modulator 116. The second RF coupler 104 is coupled between the second WLAN antenna 152 and a second transceiver 134 of the WLAN radio 130. The second transceiver 134 of the WLAN radio 130 can transmit or receive RF signals via the second WLAN antenna 152. When transmitting a transmit signal by the first transceiver 134 on a transmit path 133, the second RF coupler 104 creates a copy of the transmit signal on a second cancellation path 137. The cancellation path 137 is an electrical path with one or more components used to adjust a delay, phase, amplitude, or any combination thereof of a copy of an RF signal from the second transceiver 135. In one embodiment, disposed along the second cancellation path 137 are the second programmable-delay filter 110, the second balun 114, and second vector modulator 118. The two-way combiner 119 combines the output signals from the first vector modulator 116 and the second vector module 118 and outputs the combined signal to the third RF coupler 106. The third RF coupler 106 is coupled between a transceiver 142 of the PAN radio 140 and the PAN antenna 154.

On the first cancellation path 135, the first programmable-delay filter 108 is coupled to the first RF coupler 102, the first balun 112 is coupled to the first programmable-delay filter 108, and the first vector modulator 116 is coupled to the first balun 112. The first programmable-delay filter 108 can be controlled by the processing device 120 (e.g., AIC algorithm described below) to select a delay for the first cancellation path 135. The processing device 120 can control the first programmable-delay filter 108 to match a delay in the first cancellation path 135 to a propagation delay in an antenna path 151 between the first WLAN antenna 150 and the PAN antenna 154. The first vector modulator 116 can be controlled by the processing device 120 (e.g., AIC algorithm) to adjust a phase, an amplitude or both of an RF signal from the first transceiver 132.

On the second cancellation path 137, the second programmable-delay filter 110 is coupled to the second RF coupler 104, the second balun 114 is coupled to the second programmable-delay filter 110, and the second vector modulator 118 is coupled to the second balun 114. The second programmable-delay filter 110 can be controlled by the processing device 120 (e.g., AIC algorithm described below) to select a delay for the second cancellation path 137. The processing device 120 can control the second programmable-delay filter 110 to match a delay in the second cancellation path 137 to a propagation delay in an antenna path 153 between the second WLAN antenna 152 and the PAN antenna 154. The second vector modulator 118 can be controlled by the processing device 120 (e.g., AIC algorithm) to adjust a phase, an amplitude or both of an RF signal from the second transceiver 134.

The two-way combiner 119 combines signals from the two cancellation paths 135, 137. In particular, the two-way combiner 119 is coupled to receive an RF signal from the first vector modulator 116 and is coupled to receive an RF signal from the second vector modulator 118. The two-way combiner 119 outputs a combined signal to the third RF coupler 106.

In one embodiment, wherein the processing device is operable to execute an AIC algorithm to control the first vector modulator 116 to adjust the phase, the amplitude or both of the RF signal from a first WLAN radio, the second vector modulator to adjust the phase, the amplitude, or both of the RF signal from a second WLAN radio, the first programmable-delay filter to match a first delay in a first cancellation path to a first propagation delay in a first antenna path between the first WLAN radio and the PAN radio, and the second programmable-delay filter to match a second delay in a second cancellation path to a second propagation delay in a second antenna path between the second WLAN radio and the PAN radio. In a further embodiment, the AIC algorithm is operable to activate the bypass circuit.

In the depicted embodiment, the RFFE 100 also includes a bypass circuit including a first single pole, double throw (SPDT) switch 121 coupled to the PAN radio 140 and a second SPDT switch 123 coupled to the PAN antenna. A first terminal of the first SPDT switch 121 is coupled to the two-way combiner 119 via the third RF coupler 106. A first terminal of the second SPDT switch 123 is coupled to the third RF coupler 106. A second terminal of the first SPDT switch 121 is coupled to a second terminal of the second SPDT switch 123. In other embodiments, other bypass circuits may be used. Alternatively, the RFFE 100 also does not include a bypass circuit. The bypass circuit can be controlled by the processing device 120 (e.g., AIC algorithm). For example, the AIC algorithm can activate the bypass circuit when in operation to remove interference between the two radios when both antennas are operational and can deactivate the bypass circuit when only one or none of the radios is operational.

The electronic device 10 also includes the processing device 120. The processing device 120 is operable to execute an active interference cancellation (AIC) algorithm 122 to control the first vector modulator 116, the second vector modulator 118, the first programmable-delay filter 108, and the second programmable-delay filter 110. The processing device 120 also includes a pulse width modulator (PWM) 124 that can be controlled by the AIC algorithm 122 to generate voltage levels to control the first vector modulators 116 and second vector modulators 118. The AIC algorithm 122 can control various other switches and parameters of the RFFE circuitry 100. In one embodiment, the PWM 124 can be used to set voltage levels of the inputs of the vector modulators. In another embodiment, a pulse density modulator can be used to set the voltage levels. In another embodiment, other digital to analog circuits can be used to set the voltage levels of the vector modulators.

In the depicted embodiment, the processing device 120 is an application processor that supports AIC. The application processor may include the following software features to support AIC: 1) Adaptive algorithm 122 to optimize AIC control parameters, as described below with respect to a search algorithm described below with respect to FIGS. 6-9; 2) An interface between the processing device 120 and WLAN radio 130 (e.g., the Wi-Fi® chipset) to communicate a WLAN status of WLAN radio 130, like if WLAN transmit (TX) is active, a WLAN channel at which WLAN TX is operating, modulation and coding scheme (MCS) in use, or the like; 3) An interface between processing device 120 and the PAN radio 140 (e.g., the ZigBee/BLE chipset) to communicate measurements like received signal strength indicator (RSSI), signal to noise ratio (SNR), or the like; 4) A PWM interface definition to control the first vector modulator 116 and the second vector modulator 118 during a AIC mode; and 5) general-purpose input-output (GPIO) control to support various switch configurations, such as the switches described above, including a bypass mode by controlling the first SPDT 121 and the second SPDT 123 of the bypass circuit described above.

The electronic device 10 (also referred to herein as a user device) may be any content rendering device that includes a modem for connecting the user device to a network. Examples of such electronic devices include electronic book readers, portable digital assistants, mobile phones, laptop computers, portable media players, tablet computers, cameras, video cameras, netbooks, notebooks, desktop computers, gaming consoles, Blu-ray® or DVD players, media centers, drones, audio-input-enabled devices, speech-based personal data assistants, and the like. The electronic device 10 may also be an audio-input-enabled device, such as the Amazon Echo device, developed by Amazon Technologies, Inc. of Seattle Wash. Alternatively, the electronic device 10 may be a set-top box (STB) or other media streaming device. The electronic device may connect to a network to obtain content from a server computing system (e.g., an item providing system) or to perform other activities. The electronic device may connect to one or more different types of cellular networks.

The electronic device 10 includes a circuit board, such as a printed circuit board (PCB) upon which one or more of the components described above is disposed. The components can be integrated into one or more integrated circuits. In some embodiments, the WLAN radio 130 and the PAN radio 140 are separate integrated circuits or chipsets. In one embodiment, the RF radios (or RF modules) reside on a common carrier substrate die of an integrated circuit. In other embodiments, a processing device 120 is disposed on the PCB along with the RF radios and the RFFE circuitry 100. The processing device 120 is operable to control the RF radios (e.g., 130, 140) to radiate electromagnetic energy concurrently in the first frequency range via the first WLAN 150, second WLAN 152 and PAN antenna 154. Alternatively, the processing device 120 can be disposed on another circuit board than the RF radios. Alternatively, the RF radios can be implemented as RF circuitry in a single integrated circuit. In one embodiment, the RF circuitry includes a WLAN radio and PAN radio. In other embodiments, the RF radios may be specific to the frequency bands of interest. The processing device 120 may be an application processor (AP) the implements the AIC algorithm 122 and the PWM 124. The AP may be used for other operations of the electronic device. In another embodiment, a dedicated microcontroller with the PWM 124 and digital-to-analog (DAC) pins to create an AIC-specific implementation. In another embodiment, an application-specific integrated circuit (ASIC), a field-programmable gate array (FPGA), or other mixed-signal integrated circuits may be used to implement the AIC algorithm and control signals to control the RFFE 100.

The WLAN radio 130 includes two transceivers to operate in a MIMO architecture. The two transceivers 132, 134 of the WLAN radio 130 can both operate at 2.45 GHz and may implement the Wi-Fi® technology. It should be noted that the Wi-Fi® technology is the industry name for wireless local area network communication technology related to the IEEE 802.11 family of wireless networking standards by Wi-Fi Alliance. For example, a dual-band WLAN RF transceiver allows an electronic device to exchange data or connection to the Internet wireless using radio waves in two WLAN bands (2.4 GHz band, 5 GHz band) via one or multiple antennas. For example, a dual-band WLAN RF transceiver includes a 5 GHz WLAN channel and a 2.4 GHz WLAN channel. The WLAN radio 130 may include additional transceivers that operate in the 2.45 GHz, 5 GHz, or both. The PAN module 140 includes a transceiver that also operates at 2.4 GHz and may implement the Bluetooth® technology. The WLAN radio 130 and PAN radio 140 can be individual chipsets, even chipsets provided by different vendors. The WLAN radio 130 and the PAN radio 140 may be implemented in the same chipset or on a common carrier substrate with the processing device 120, such as in a System on Chip (SoC) architecture. In another embodiment, other wireless RF radios may be used to implement other technologies, such as the LTE technology, the Zigbee® technology, or the like. For example, the RF circuitry may include other radios, such as a wireless area network (WAN) radio, a personal area network (PAN) radio, global navigation satellite system (GNSS) radio (e.g., global positioning system (GPS) radio), or the like. In other embodiments, the antenna architecture may include additional RF radios and/or other communication modules, such as a wireless local area network (WLAN) radio, a GPS receiver, a near field communication (NFC) radio, an amplitude modulation (AM) radio receiver, a frequency modulation (FM) radio receiver, a personal area network (PAN) radio (e.g., Bluetooth® radio, Zigbee® radio), a Global Navigation Satellite System (GNSS) receiver, or the like. The RF circuitry may also include receivers and/or transmitters, filters, amplifiers, mixers, switches, and/or other electrical components. The RF circuitry may be coupled to a modem that allows the user device to handle both voice and non-voice communications (such as communications for text messages, multimedia messages, media downloads, web browsing, etc.) with a wireless communication system. The modem may provide network connectivity using any type of digital mobile network technology including, for example, LTE, LTE advanced (4G), CDPD, GPRS, EDGE, UMTS, 1×RTT, EVDO, HSDPA, WLAN (e.g., Wi-Fi® network), etc. In the depicted embodiment, the modem can use the RF circuitry to radiate electromagnetic energy on the antennas to communication data to and from the user device in the respective frequency ranges. In other embodiments, the modem may communicate according to different communication types (e.g., WCDMA, GSM, LTE, CDMA, WiMAX, etc.) in different cellular networks. It should be noted that radiation enables functionality of both transmission and receiving data using reciprocity.

In one embodiment, the first transceiver 132 of the WLAN radio 130 is operable to radiate electromagnetic energy via the first WLAN antenna 150 in a first frequency range and the second transceiver 134 of the WLAN radio 130 is operable to radiate electromagnetic energy via the second WLAN antenna 152 in the first frequency range concurrently with the first transceiver 132. The transceiver 142 of the PAN radio 140 is operable to radiate electromagnetic energy via the PAN antenna 154 in the first frequency range concurrently with the first transceiver 134, the second transceiver 134, or both. For example, the WLAN radio 130 can use the Wi-Fi® technology in the 2.45 GHz frequency band and the PAN radio 140 can use the Bluetooth® technology in the 2.4 GHz frequency band concurrently with sufficient isolation between the WLAN radio 130. This isolation can be achieved with the RFFE circuitry 100 that implements AIC and does so without time switching architecture as done conventionally in compact portable devices.

In some embodiments, the first transceiver 132 and the second transceiver 134 of the WLAN radio 130 can be configured to operate the first WLAN antenna 150 and the second WLAN antenna 152 in a beam-forming manner. Alternatively, the first transceiver 132 and the second transceiver 134 of the WLAN radio 130 and the transceiver 142 of the PAN radio 140 can operate the first WLAN antenna 150, the second WLAN antenna 152, or both and the PAN antenna 154 concurrently with sufficient isolations because of the RFFE circuitry 100 that implements AIC as described herein.

Figure 2:
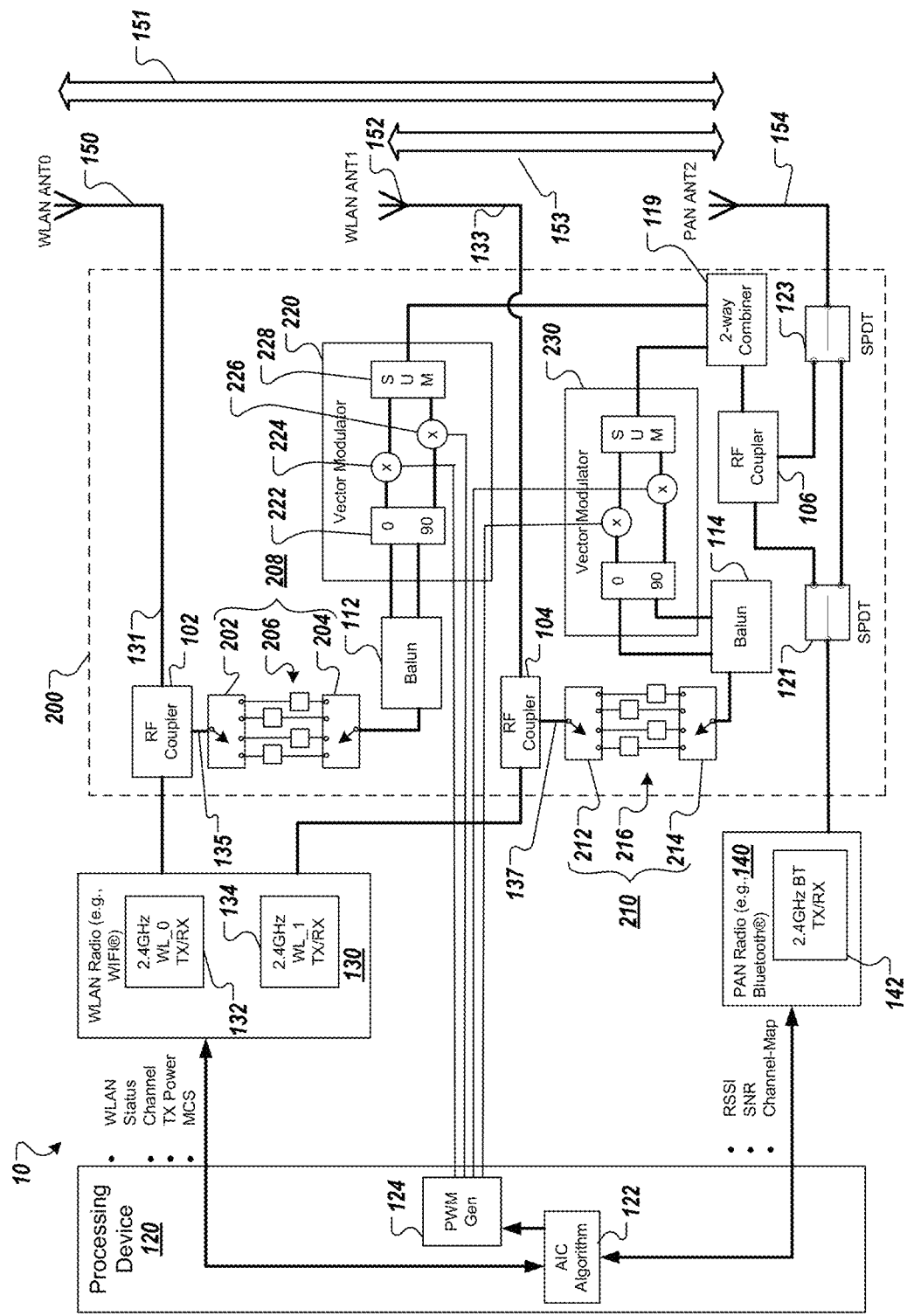
FIG. 2 is a block diagram of RFFE circuitry for AIC according to another embodiment.

FIG. 2 is a block diagram of RFFE circuitry 200 for AIC according to another embodiment. The RFEE circuitry 200 may reside in the electronic device 10 as described above with respect to FIG. 1. The RFFE circuitry 200 is similar to RFFE circuitry 100 as noted by similar reference labels. The first programmable-delay filter 208 of the RFFE circuitry 200 includes a first single pole, N-throw (SPNT) switch 202, where N is a positive integer greater than one, a second SPNT switch 204, and multiple lumped elements 206 disposed in individual delay paths between the first SPNT 202 and the second SPNT 204. The lumped elements 206 have different values to result in different delays in the individual delay paths. The second programmable-delay filter 210 of the RFFE circuitry 200 includes a first SPNT switch 212, where N is a positive integer greater than one, a second SPNT switch 214, and multiple lumped elements 216 disposed in individual delay paths between the first SPNT 212 and the second SPNT 214. The lumped elements 206 have different values to result in different delays in the individual delay paths. In one embodiment, a first lumped element disposed in a first delay path between the first SPNT and the second SPNT and a second lumped element disposed in a second delay path between the first SPNT and the second SPNT. The second lumped element includes a different value than the first lumped element to result in a longer delay in the second delay path than in the first delay path. In another embodiment, the programmable-delay filters can be other components to control one or more delay paths. For example, one or more delay paths can include a digitally-controlled varactor to adjust the delay of the delay path. Alternatively, other components can be used in the programmable-delay filters.

In the depicted embodiment, the first vector modulator 220 applies a variable gain and a variable phase shift to generate any amplitude and phase. The AIC algorithm 122 can control the PWM 124 to set a magnitude of I and Q, respectively, of the first vector modulator 220. In particular, a RF signal from the first programmable-delay filter 208 is split by the balun into a differential signal. The differential signal is split into two signals that are 90 degrees apart in phase and quadrature using, for example, a polyphase network 222. The two halves of the RF signal are then passed through independent variable attenuators 224, 226 (e.g., Gilbert Cell mixer), which can also provide 180 degrees phase shift. The variable attenuator 224 sets the magnitude of I in response to a first voltage level received from the PWM 124 and the variable attenuator 226 sets the magnitude of Q in response to a voltage level received from the PWM 124. The two signals from the variable attenuators 224, 226 are then recombined using an in-phase combiner 228. The first vector modulator 220 can adjust the phase and amplitude of the RF signal in the first cancellation path 135. The second vector modulator 230 includes similar components (illustrated, but not labeled in FIG. 2) to generate a RF signal with any amplitude and phase. The second vector modulator 230 can adjust the phase and amplitude of the RF signal in the second cancellation path 137.

In one embodiment, the first vector modulator 220 operates according to the following formula:

$$|G| = G_{MAX} \times 2 \times \sqrt{\left(\frac{I - V_{mi}}{V_{RANGE}}\right)^2 + \left(\frac{Q - V_{mq}}{V_{RANGE}}\right)^2} = G_{MAX} \times r,$$

$$\angle\theta = \arctan\left[\frac{Q - V_{mq}}{I - V_{mi}}\right],$$

where $V_{mi}$ and $V_{mq}$ describe the gain null point for I and Q, respectively, $V_{RANGE}$ defines the range of I and Q control,
$G_{MAX}$ is maximum gain, and
r describes a circle of variable radius, with maximum radius of r=1.

The second vector modulator 230 can operate according to the same formula, but may be independently controlled by different voltage levels for I and Q. Alternatively, the first vector modulator 220 and second vector modulator 230 operate according to other operations to adjust a phase and an amplitude of an RF signal.

The embodiments of the electronic devices 10 of FIGS. 1-2 are multiple-input-multiple-output (MIMO) WLAN and PAN antenna system with AIC. The embodiments described herein regarding AIC can also be implemented in a single-input-single-output (SISO) WLAN and PAN antenna system.

Figure 3A:
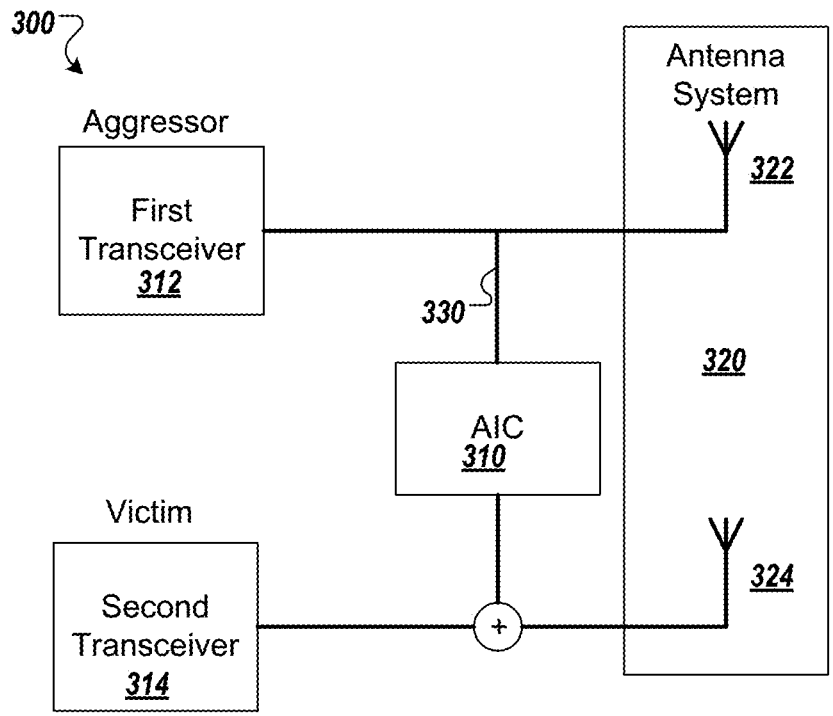
FIG. 3A is a block diagram of a single-input-single-output (SISO) wireless local area network (WLAN) and personal area network (PAN) antenna system with AIC according to one embodiment.

FIG. 3A is a block diagram of a SISO WLAN and PAN antenna system 300 with AIC 310 according to one embodiment. The SISO WLAN and PAN antenna system 300 may be employed in a digital media player and micro-console, a set-top box (STB), or other electronic device. The SISO WLAN and PAN antenna system 300 includes an antenna system 320 with a first antenna 322 and a second antenna 324. A first transceiver 312 is operable to radiate electromagnetic energy via the first antenna 322 and a second transceiver 314 is operable to radiate electromagnetic energy via the second antenna 324. An AIC tool 310 is disposed along a cancellation path 330 between the first antenna 322 and the second antenna 324. The AIC tool 310 is a simple representation of the RFFE circuitry and the AIC algorithm described above with respect to FIGS. 1-2. The AIC tool 310 addresses the radio interference challenges when the two antennas are operating in the same frequency spectrum.

In this embodiment, the first transceiver 312 is considered the aggressor and the second transceiver is considered the victim. In this architecture, both the first transceiver and the second transceiver can transmit and receive simultaneously. However, since both transceivers are on at the same time, the aggressor's transmit signal will present itself as unwanted signal at the victim's transceiver, causing interference. Because of this interference, the operable range could be reduced without the use of the AIC tool 310. For example, to maximize the operable range, an isolation of at least 60 dB is desired between the two transceivers. Since the antennas are disposed in a compact consumer electronic, the AIC tool can be used to mitigate interference in simultaneous operation architecture. This reduction in interference as a result of the AIC tool 310 is illustrated in FIG. 3B.

Figure 3B:
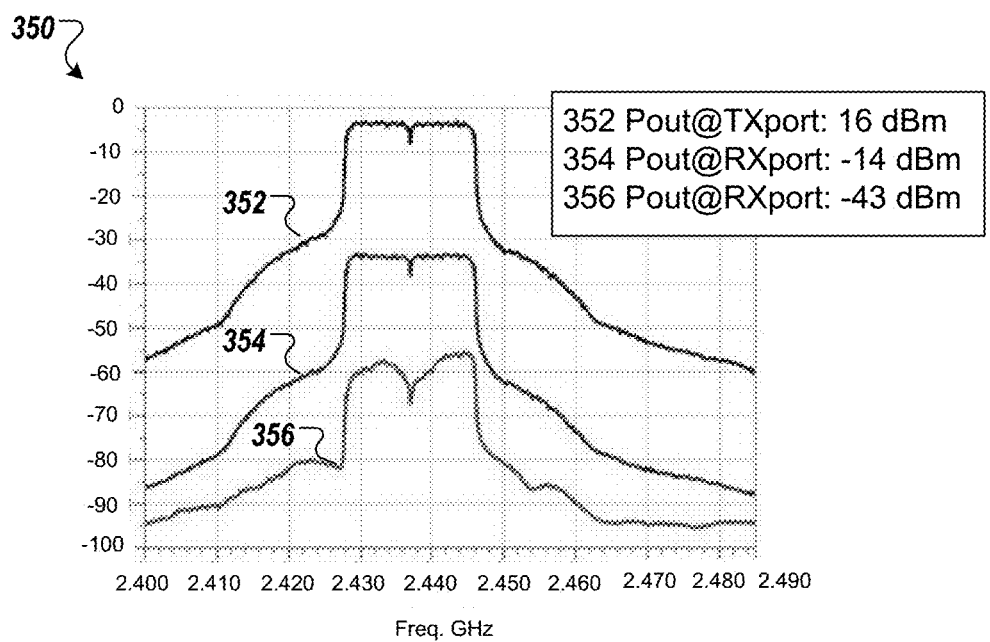
FIG. 3B is a graph of the power spectrum density of the antenna system of FIG. 3A with AIC and without AIC according to one embodiment.

FIG. 3B is a graph 350 of the power spectrum density of the antenna system 300 of FIG. 3A with AIC 310 and without AIC 310 according to one embodiment. The graph 350 illustrates the power spectrum density at the TX and RX ports between 2.4 GHz and 2.45 GHz. In particular, the graph 350 illustrates the power spectrum density at a TX port of the first transceiver 312. The power is 16 dBm at the TX port. The graph 350 also illustrates the power spectrum density at a RX port of the second transceiver 314 without using AIC 310. The power is −14 dBm at the RX port without using AIC 310. The graph 350 also illustrates the power spectrum density at a RX port of the second transceiver 314 using AIC 310. The power is −43 dBm at the RX port using AIC 310.

Embodiments of the AIC make use of the fact that the electronic device knows exactly what the aggressor radio is transmitting. By copying the aggressor transmit signal, manipulating the delay, amplitude, and phase of the copied signal, AIC can present a signal equal in amplitude but 180° out of phase to the signal that normally shows up at the victim receiver through the antenna coupling. When these two signals are added together in the victim's receiver chain, the aggressor signal will be removed due to destructive interference. At the heart of AIC implementation is a vector modulator, which is used to adjust the amplitude and phase of the copied signal.

As illustrated in FIG. 3B, the benefit of AIC is shown in a lab experiment with a spectrum analysis in the place of the second transceiver 314 proven in lab experiments. In the first experiment, AIC impact on total isolation from aggressor transmitter to victim receiver is explored. The experiment was performed with Single Input Single Output (SISO) WLAN as aggressor, as illustrated in FIG. 3A. The antenna system 320 of a digital media player and microconsole was used to simulate achievable isolation between two antennas in an existing product. FIG. 3B illustrates the difference in aggressor transmit power at the input of victim receiver (curve 356) with AIC 310 and at the input of the victim receiver (curve 354) without AIC. The results showed an improvement of total isolation from approximately 22 dB to over approximately 59 dB.

Figure 4A:
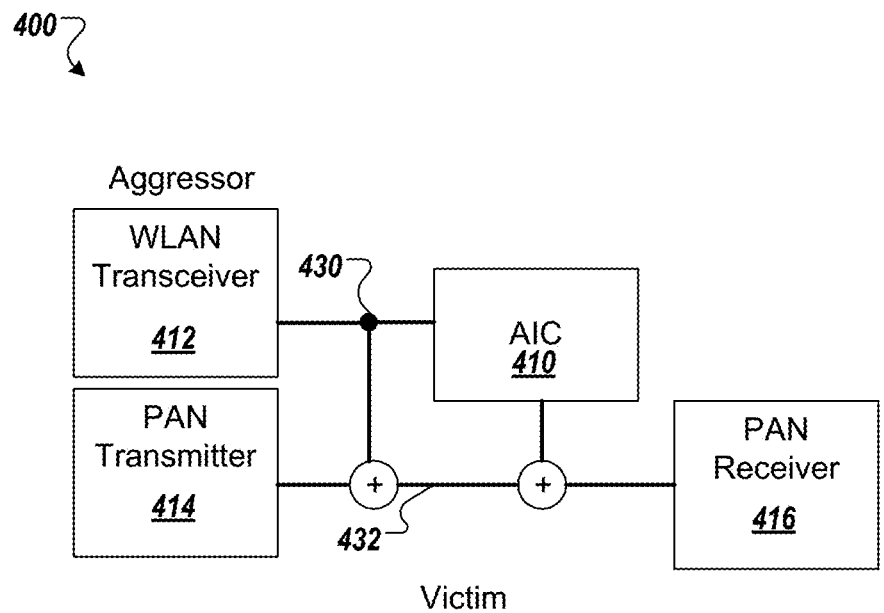
FIG. 4A is a block diagram illustrating sensitivity of a SISO WLAN and PAN antenna system according to one embodiment.

FIG. 4A is a block diagram illustrating sensitivity of a SISO WLAN and PAN antenna system 400 with AIC 410 according to one embodiment. The SISO WLAN and PAN antenna system 400 may be employed in a digital media player and micro-console, a set-top box (STB), or other electronic device. The SISO WLAN and PAN antenna system 400 includes a WLAN transceiver 412 that is considered the aggressor, a PAN transmitter 414 and PAN receiver that is considered the victim. An AIC tool 410 is disposed along a cancellation path 430 between the WLAN transceiver 412 and the PAN receiver 416. The AIC tool 410 is a simple representation of the RFFE circuitry and the AIC algorithm described above with respect to FIGS. 1-2. The AIC tool 410 addresses the radio interference challenges when the two antennas are operating in the same frequency spectrum.

In this embodiment, the WALN transceiver 412 is considered the aggressor and the PAN receiver 416 is considered the victim. In this architecture, both the WLAN transceiver 412 and the PAN receiver 416 can transmit and receive concurrently. However, since both the WLAN transceiver 412 and the PAN receiver 416 are on at the same time, the aggressor's transmit signal will present itself as unwanted signal at the victim's receiver, causing interference. Because of this interference, the operable range could be reduced without the use of the AIC tool 410. For example, to maximize the operable range, an isolation of at least 60 dB is desired between the WLAN transceiver 412 and the PAN receiver 416. Since the antennas are disposed in a compact consumer electronic, the AIC tool 410 can be used to mitigate interference in simultaneous operation architecture. This reduction in interference as a result of the AIC tool 410 is illustrated in FIG. 4B.

Figure 4B:
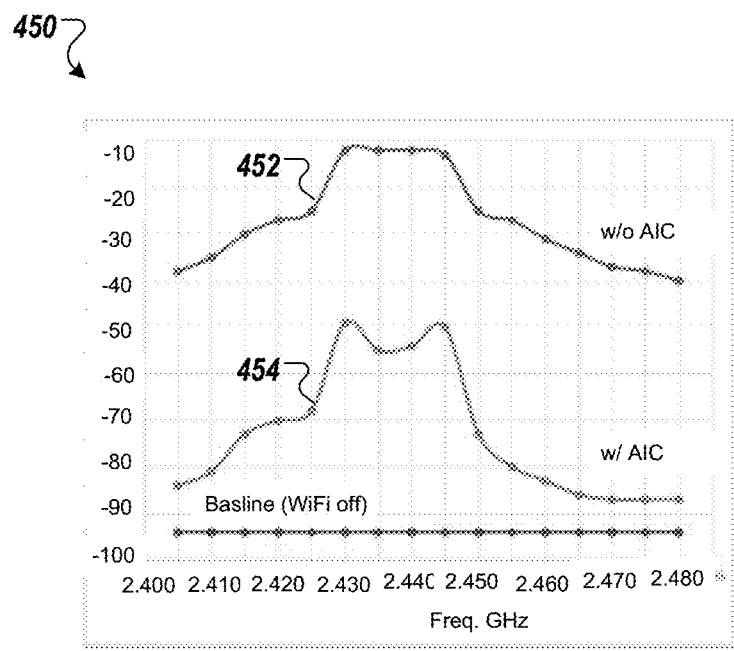
FIG. 4B is a graph of the sensitivity of the antenna system of FIG. 4A according to one embodiment.

FIG. 4B is a graph 450 of the power spectrum density of the antenna system 400 of FIG. 4A with AIC 410 and without AIC 410 according to one embodiment. The graph 450 illustrates the power spectrum density at the reference point 432 in FIG. 4A. In particular, the graph 450 illustrates the power spectrum density 452 when not using AIC 410 in the cancellation path 430 and the power spectrum density 454 when using AIC 410 in the cancellation path 430.

In a second experiment, AIC impact on system level improvement is validated as shown in FIG. 4B. As shown in FIG. 4A, the experiment was tested with the SISO WLAN as aggressor and PAN as victim, and PAN reference sensitivity level was measured with and without AIC. With −14 dBm WLAN TX power at the reference point 432, which simulates an antenna isolation of 30 dB, there would be over 50 dB de-sense without AIC. By activating AIC, de-sense was reduced to less than 10 dB in the non-overlapping edge channels (channel 11 and channel 24, 25, 26).

FIG. 5A is a block diagram of a conventional time-switched radio architecture 500. As described above, for conventional multi-user multiple-input multiple-output (MU-MIMO) antenna system, multiple antennas are needed to achieve data rates up to several Gbits/s. The conventional antennas need to be separated in space or in time. In compact electronic devices, space may not be feasible, so these conventional radio architectures use time-switched architectures. For example, as illustrated in FIG. 5A, an application processor 501 may interface with a WLAN radio 503 and a PAN radio 505. In order to permit both WLAN radio 503 and the PAN radio 505 to operate in the same frequency, one antenna 502 may be used, but a switch 507 is needed to switch the antenna 502 between the WLAN radio 503 and the PAN radio 505 in turn. That is both WLAN radio 503 and the PAN radio 505 cannot operate concurrently or simultaneously. Typically, a co-existence interface 509 is coupled between the WLAN radio 503 and the PAN radio 505 to share the use of the switch 507 and antenna 502.

To operate multiple radios in the same band, e.g., 2.4 GHz ISM band, within the same device in simultaneous or concurrent operations, embodiments of the Active Interference Cancellation can be used to address the radio interference challenges as illustrated in FIGS. 1-2, 3A, 4A and FIG. 5B. For example, the diagram in FIG. 1 illustrates an implementation where there are 2×2 MIMO WLAN radios (e.g., Wi-Fi® technology) that are the aggressor and the PAN radio (e.g., Bluetooth® technology or Zigbee® technology) is the victim.

FIG. 5B is a block diagram of a radio architecture 550 for simultaneous operation using AIC according to a conventional solution. An application processor 551 may interface with a WLAN radio 553 and a PAN radio 555. In order to permit both WLAN radio 553 and the PAN radio 555 to operate in the same frequency, AIC 510 is used to remove the interference between the two antenna 552, 554 and corresponding RF radios 553, 555, respectively. This simultaneous operation radio architecture does not need a switch or time-switch operations of the WLAN radio 553 and the PAN radio 555, as done conventionally. That is both WLAN radio 553 and the PAN radio 555 can operate concurrently or simultaneously.

In one embodiment, a processing device executes an AIC algorithm as described herein. RFFE circuitry is coupled to the processing device and includes the following: a first RF coupler coupled between a first antenna and a first transceiver in a transmit path; a second RF coupler coupled between a second antenna and a second transceiver in a receive path; a cancellation path coupled between the first RF coupler and the second RF coupler; a programmable-delay filter disposed along the cancellation path between the first RF coupler and the second RF coupler; and a vector modulator disposed along the cancellation path between the first RF coupler and the second RF coupler. The AIC algorithm is operable to control the programmable-delay filter to match a delay in the cancellation path to a propagation delay in an antenna path. The AIC algorithm is operable to control the vector modulator to adjust a phase, an amplitude or both of a copy of a first RF signal transmitted via the first antenna to generate a second RF signal. The second RF signal is added to a third RF signal via the second RF coupler to remove from the third RF signal interference caused by the first RF signal. This is done using destructive interference. In some embodiments, the first transceiver and the second transceiver operate in a same frequency spectrum concurrently without time-switching. In other embodiments, the first transceiver and the second transceiver operate in concurrently in the 2.4 GHz industrial, scientific and medical (ISM) radio band. In another embodiment, one transceiver operates in the 2.4 GHz ISM band and the other operates in an LTE bands B7/B30/B41 at 2.5 GHz-2.57 GHz, which is very close to the 2.4 GHz ISM bands.

In a further embodiment, the RFFE further includes the following: a third RF coupler coupled between a third antenna and a third transceiver in a second transmit path; a second programmable-delay filter disposed along a second cancellation path between the third RF coupler and the second RF coupler; a second vector modulator disposed along the second cancellation path between the third RF coupler and a two-way combiner; and the two-way combiner coupled to the second vector modulator, the vector modulator, and the second RF coupler.

As illustrated in FIGS. 1 and 2, the proposed architecture consists of four SP4 Ts, two SP2 Ts, eight delay filters, two vector modulators (VM), one combiner, and three hybrid couplers. The four delay filters on each cancellation path are prepared for matching the propagation delay from antenna path. By matching the cancellation path delay to that of the antenna path via the delay filters, the phase mismatch in pass band between the two paths can be minimized, which maximize the interference cancellation in operating band.

As illustrated in FIG. 2, the programmable-delay filter can includes four different delay filters with two SP4T at input and output of filter on each cancellation path. It should be noted that depending on device environment, AIC algorithm may need to select one switching path physically to maximize the isolation between the two radios. In one embodiment, as illustrated in FIG. 2, the programmable-delay filter includes a first single pole, N-throw (SPNT) switch, where N is a positive integer greater than one and a second SPNT switch. Multiple lumped elements are disposed in individual delay paths between the first SPNT and the second SPNT. The lumped elements have different values to result in different delays in the individual delay paths. In another embodiment, an array of lumped element bandpass filters may be used to select phase delays during operation based on one antenna environment and another phase delay can be selected based on another antenna environment. As described herein, the AIC algorithm is operable to control the first programmable-delay filter and the second programmable-delay filter to select phase delays during operation based on an antenna environment and to control the vector modulator and the second vector modulator adjust amplitude and phase for interference cancellation. In another embodiment, the AIC algorithm is operable to adjust parameters of the RFFE circuitry to accommodate changes in the antenna environment.

In FIGS. 1-2, the two SPDTs in PAN (e.g., BT/BLE) receive path enables an option to bypass AIC depending on WLAN TX (e.g., Wi-Fi®) presence. The AIC coupler insertion loss degrades the reference sensitivity level and transmit power of the PAN (BT/BLE). When there is no WLAN TX activity, AIC is bypassed to minimize performance degradation on both transmission and reception operation. When both WLAN TX and PAN RX are active, AIC circuit is turned on and coupler path is selected. In one embodiment, a bypass circuit includes a first single pole, double throw (SPDT) switch coupled to the third transceiver; and a second SPDT switch coupled to the third antenna. A first terminal of the first SPDT switch is coupled to the two-way combiner via the third RF coupler. A first terminal of the second SPDT switch is coupled to the third RF coupler. A second terminal of the first SPDT switch is coupled to a second terminal of the second SPDT switch.

In another embodiment, the RFFE circuitry further includes a balun coupled between the programmable-delay filter and the vector modulator. The balun is an electrical component that converts an unbalanced signal (i.e., a signal with respect to ground or other reference) to a balanced signal (i.e., a differential signal). The balun can be used to prepare the signal for the vector modulator that uses two input signals.

The following description is directed to software features that can be implemented in a processing device, such as an Application Processor (AP) to support AIC. That is, the AIC algorithm can be used to control the RFFE with AIC features described above. In particular, the processing device includes one or more of the following software features:

1. Adaptive algorithm to optimize AIC control parameters using a search algorithm described with respect to FIGS. 6-9B.
2. An interface between processing device and a first RF chipset to communicate the status of the first RF chip set, like if TX is active, channel at which TX is operating, MCS, or the like.
3. An interface between processing device and second RF chipset to communicate the status of the second RF chipset, such as ZigBee/BLE chipset, and/or measurements like RSSI, SNR, or the like.
4. A PWM interface definition to control vector modulator during AIC.
5. GPIO control to support various switch configurations.

It should be noted that the implementation are not restricted to the components as shown. For example, a dedicated microcontroller with PWM or DAC pins can also be used in place of AP, creating a standalone AIC implementation. For another example, the couplers can be replaced with combiner/divider or balun. It should also be noted that the radios do not need to be restricted to 2.4 GHz ISM band radios. AIC can be extended to any radios working simultaneously within a device and causes interference to each other. For example, LTE B7/B30/B41 transmits at 2.5 GHz-2.57 GHz, which is very close to the 2.4 GHz ISM bands. In one embodiment, the first transceiver is a wide area network (WAN) radio and the second transceiver is a PAN or WLAN radio. For example, some WAN radios may operate in 800 MHz and 900 MHz ISM bands, such as LTE B5/B7 and the PAN radio may operate in 900 MHz ISM band. Alternatively, other combination of radio technologies may be implemented and the AIC can be used to remove interference at the victim radio caused by the aggressor radio. As noted herein, the interference has conventionally been handled by using high cost filters, power back off, and/or time division between the radios. These items result in added cost, reduce range, and lowered throughput. These shortcomings may be addressed by applying AIC, such as in a setup where LTE B7/B30/B41 is the aggressor and 2.4 GHz ISM band radio is the victim.

Since aggressor transmit signal that coupled to the victim receive chain through the antennas varies greatly based on the environment, the AIC implementation must be able to optimize itself to identify the amplitude and phase setting of the copied path. In order to provide the maximum cancellation, the AIC algorithm can be used to determine and apply the amplitude, phase, and delay parameters of the RFFE. One embodiment is set forth in the flow diagram of FIG. 6.

As described above, most vector modulators can adjust an input RF signal with a variable gain and a variable phase shift to obtain an output RF signal. By setting the magnitude of I and Q respectively, the vector modulator can generate any amplitude or phase. The input RF signal is split into two signals that are 90 degrees apart in phase and quadrature (i.e. Polyphase Network). The two halves of the RF signal are then passed through independent variable attenuators (i.e. Gilbert Cell Mixer) which can also provide 180 degrees phase shift. The two signals are then recombined using an in-phase combiner.

Figure 6:
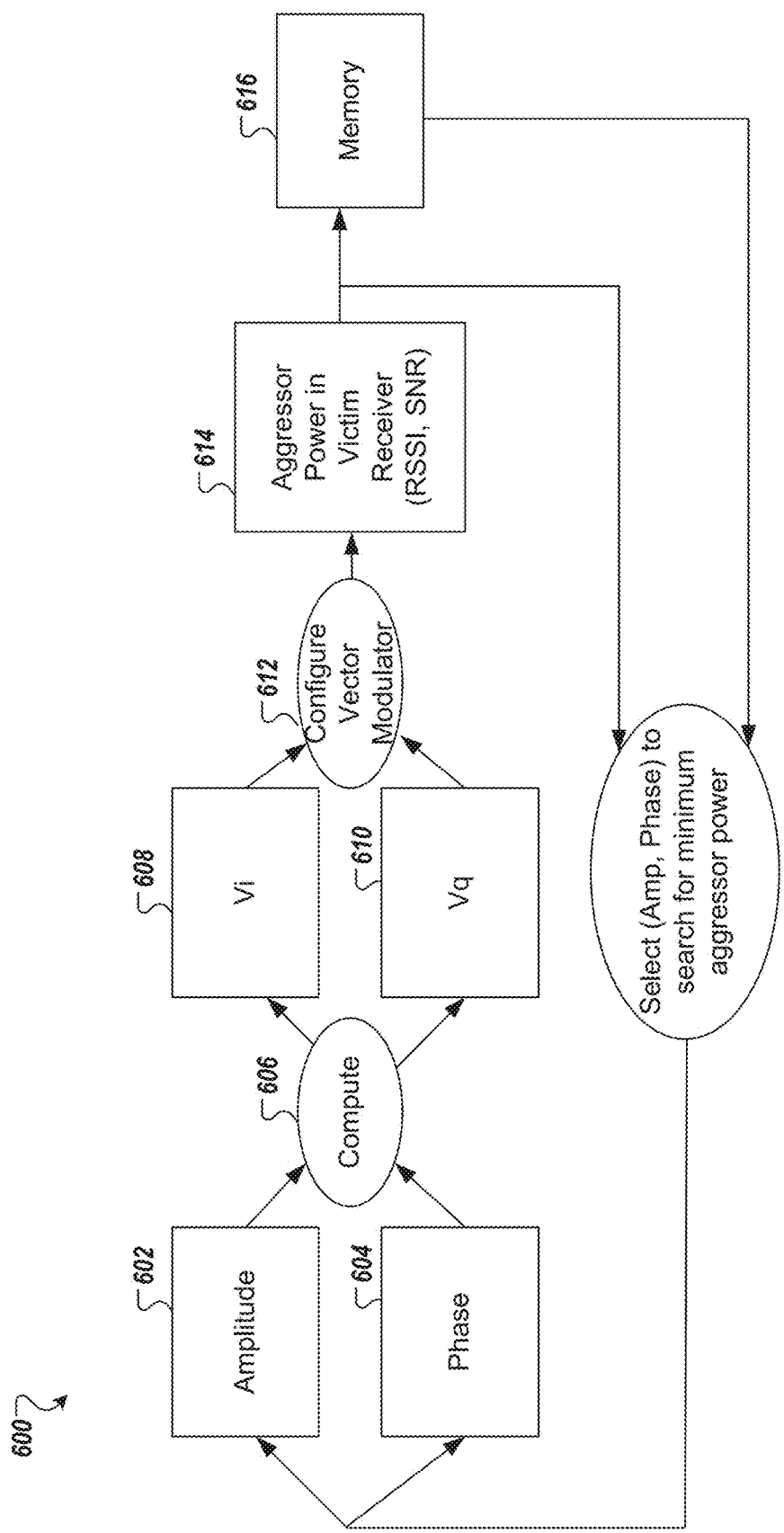
FIG. 6 is a flow diagram of an AIC algorithm to determine amplitude and phase of a signal for cancellation according to one embodiment.

FIG. 6 is a flow diagram of an AIC algorithm 600 to determine amplitude and phase of a signal for cancellation according to one embodiment. AIC algorithm 600 may be implemented using processing logic comprising hardware, software, firmware, or any combination thereof. In one embodiment, the AIC algorithm 122 of FIG. 1 or FIG. 2 implements the AIC algorithm 600. As described above, the processing device can have control over the RF radios, including an aggressor RF radio and a victim RF radio. The aggressor RF radio can be set to transmit and the victim RF radio can be set to listen. When the amplitude and the phase of a copied signal path, such as from the RF coupler in the cancellation path, an amount of power delivered to the victim RF radio will vary. To measure the power delivered to the victim RF radio, the corresponding voltage levels can be supplied to the vector modulator's IQ input (labeled Vi and Vq).

Referring to FIG. 6, the processing logic selects an amplitude (block 602) and selects a phase (block 604). At block 606, the processing logic computes the voltage level Vi for the amplitude (block 608) and computes the voltage level Vq for the phase (block 610). At block 612, the processing logic configures the vector modulator. For example, the processing logic instructs a pulse width modulator to output corresponding voltage levels for Vi and Vq to the I and Q inputs of the vector modulator to adjust the amplitude and phase of the input RF signal. At block 614, the processing logic determines an aggressor power at the victim RF radio. This may be done by the processing logic requesting a status from the victim RF radio, such as to obtain RSSI, SNR, or the like. The processing logic stores in memory the aggressor power corresponding to the amplitude and phase, and returns to block 616 to select another amplitude and phase and the process is repeated for the possible amplitude and phase combinations. At block 616, the processing logic also searches for the amplitude and phase that corresponding to a minimum power aggressor. The amplitude and phase for this minimum power can be used for a particular antenna environment. In a different antenna environment, different amplitude and phase values may be selected.

In another embodiment, the processing logic instructs a first transceiver to transmit a first radio frequency (RF) signal via a first antenna. The processing logic instructs a second transceiver to receive a second RF signal via a second antenna, the second RF signal includes interference from the first RF signal transmitted through an antenna path from the first antenna to the second antenna. The processing logic controls a first programmable-delay filter, disposed in a cancellation path between the first transceiver and the second transceiver, to match a delay in the cancellation path to a propagation delay in the antenna path. The processing logic controls a first vector modulator, disposed in the cancellation path, to generate a second RF signal by adjusting a phase, an amplitude, or both of a copy of a first RF signal transmitted via the first antenna. The second RF signal is added to a third RF signal received via the second antenna to remove from the third RF signal interference caused by the first RF signal. By adding the second RF signal to the third RF signal, the second RF signal is removed due to destructive interference when the appropriate parameters are selected, including the delay of the antenna path, the phase and amplitude of the RF signal from the aggressor RF radio.

In a further embodiment, the processing logic selects a value for the first programmable-delay filter to set a first delay in the cancellation path. The processing logic determines an amplitude and a phase for the second RF signal that result in a minimum power by the third signal. The minimum power is the lowest power measured for the various adjustments to the amplitude, phase, or both of the RF signal.

In one embodiment, the processing logic searches for the amplitude and phase by setting a first amplitude value and a first phase value and supplying a voltage level to the first vector modulator by a PWM to generate the second RF signal with the set first amplitude value and the first phase value. In another embodiment, the processing logic generates the second RF signal having the first amplitude value and the first phase value. The processing logic measures a power of the third signal. The power may represent the power delivered to the second transceiver from the first signal transmitted via the first antenna. In one embodiment, the processing logic determines the power by receiving a report from the second transceiver, the report containing at least one of RSSI, SNR, or the like. The processing logic adjusts the first amplitude value, the first phase value, or both to find the minimum power by the third signal.

In another embodiment, the processing logic searches for the amplitude and the phase by performing various searches with different resolutions as illustrated in FIGS. 7B-9B. In order to understand FIGS. 7B-9B, FIG. 7A is a graph 700 illustrating a mapping of voltage to amplitude and phase coordinate 702 in terms of Vq and Vi used in the AIC algorithm according to one embodiment.

The following description with respect to FIGS. 7B-9B are directed to the various searches with different resolutions to determine an amplitude and phase coordinate for the copied signal to remove the signal from the victim RF for AIC. It should be noted that a couple of facts can be used to reduce a search space for the amplitude and phase coordinate. First, when adding two of the same signals together, the signals add constructive when they are in phase, and the signals interfere destructively when they are 180° out of phase. If the processing logic can fix the copied signal amplitude and vary the phase, there will be a phase that presents the highest (constructive) aggressor signal at the victim receiver, and the phase 180° away from that point will present the lowest (destructive) aggressor signal. Second, typical antenna isolation within the device can be known by design. Antenna isolation may vary depending on the environment, but the processing logic can start with default values for the different environments by the processing logic measuring device antenna isolation in various environments in the design phase. With a default value for the amplitude, the processing logic can reduce the search iterations and provide higher cancellation variation when the phase is adjusted.

Figure 7A:
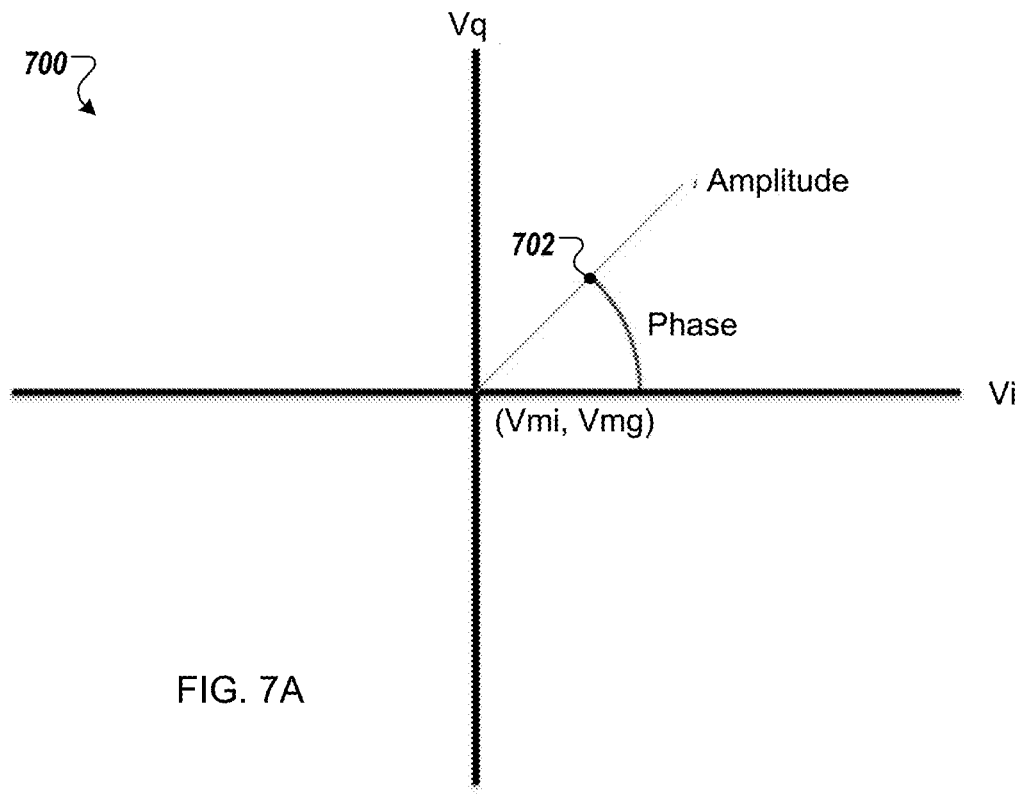
FIG. 7A is a graph illustrating a mapping of voltage to amplitude and phase coordinate used in an AIC algorithm according to one embodiment.
Figure 7B:
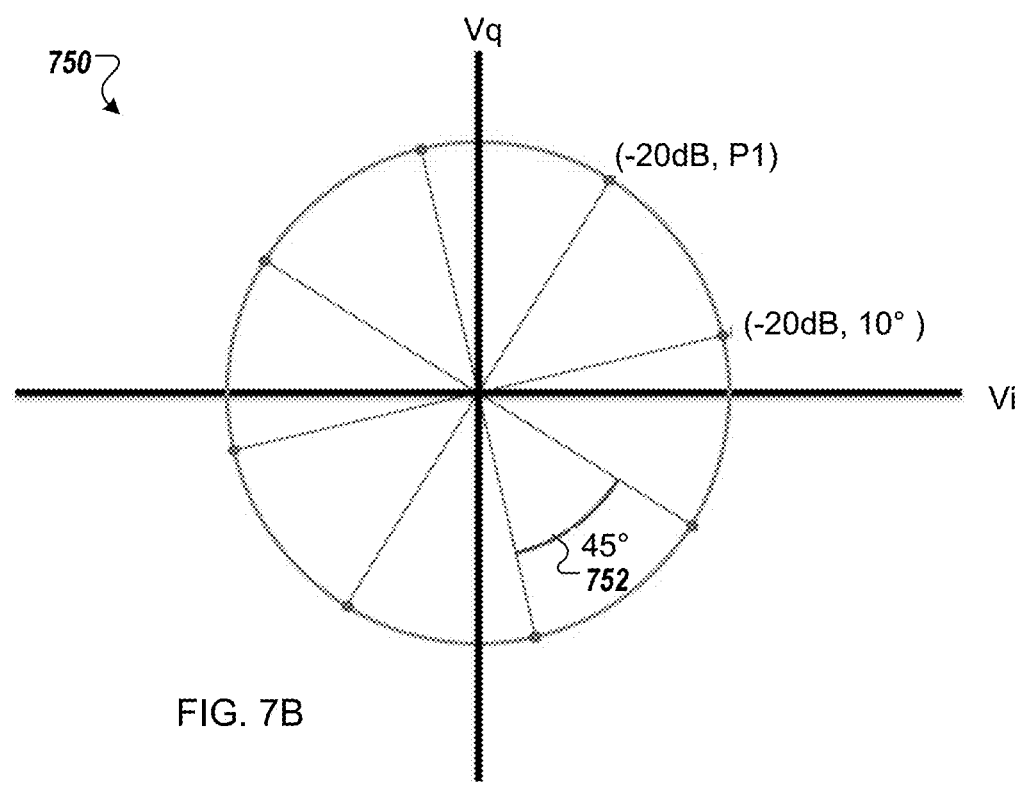
FIG. 7B is a graph illustrating a first search with a first phase resolution used in the AIC algorithm to reduce a search space to determine the phase of the signal for cancellation according to one embodiment.

In a first stage of a multi-stage search for the amplitude and phase coordinate, the processing logic performs a first search with a first phase resolution used to reduce a search space to determine the phase of the second signal to remove from the third RF signal interference caused by the first RF signal. FIG. 7B is a graph 750 illustrating a first search with a first phase resolution used in the AIC algorithm to reduce a search space to determine the phase of the signal for cancellation according to one embodiment.

Figure 8A:
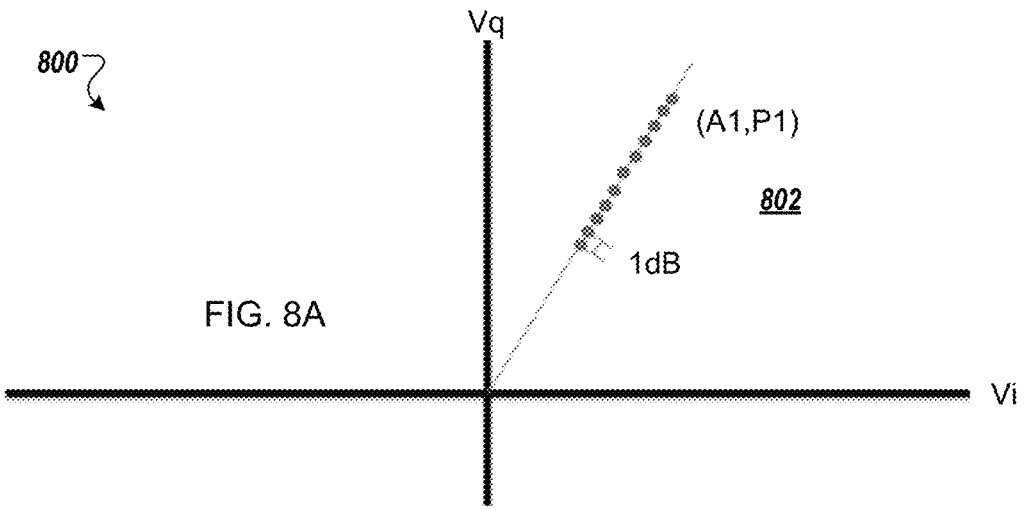
FIG. 8A is a graph illustrating a second search with a first amplitude resolution used in the AIC algorithm to reduce the search space to determine the amplitude of the signal for cancellation according to one embodiment.

In a second stage, the processing logic performs a second search with a first amplitude resolution to reduce the search space to determine the amplitude of the second signal to remove from the third RF signal interference caused by the first RF signal. In this example, it is assumed that typical antenna isolation is 20 dB. The processing logic can step through eight different phases to reduce the search space to a 45 degree pie slice 752. The processing logic may avoid 180 degrees intentionally to avoid numerical calculation confusion of positive and negative 180 degrees, since it may vary depending on the programming language used. FIG. 8A is a graph 800 illustrating a second search 802 with a first amplitude resolution used in the AIC algorithm to reduce the search space to determine the amplitude of the signal for cancellation according to one embodiment.

Figure 8B:
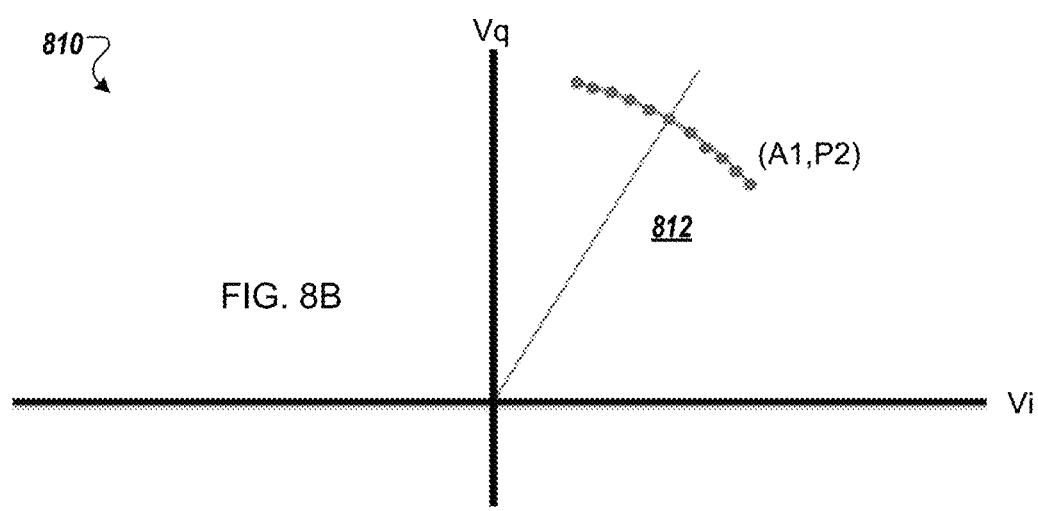
FIG. 8B is a graph illustrating a third search with a second phase resolution used in the AIC algorithm to further reduce the search space to determine the phase of the signal for cancellation according to one embodiment.

In a third stage, the processing logic performs a third search with a second phase resolution to further reduce the search space to determine the phase of the second signal. FIG. 8B is a graph 810 illustrating a third search 812 with a second phase resolution used in the AIC algorithm to further reduce the search space to determine the phase of the signal for cancellation according to one embodiment.

Figure 8C:
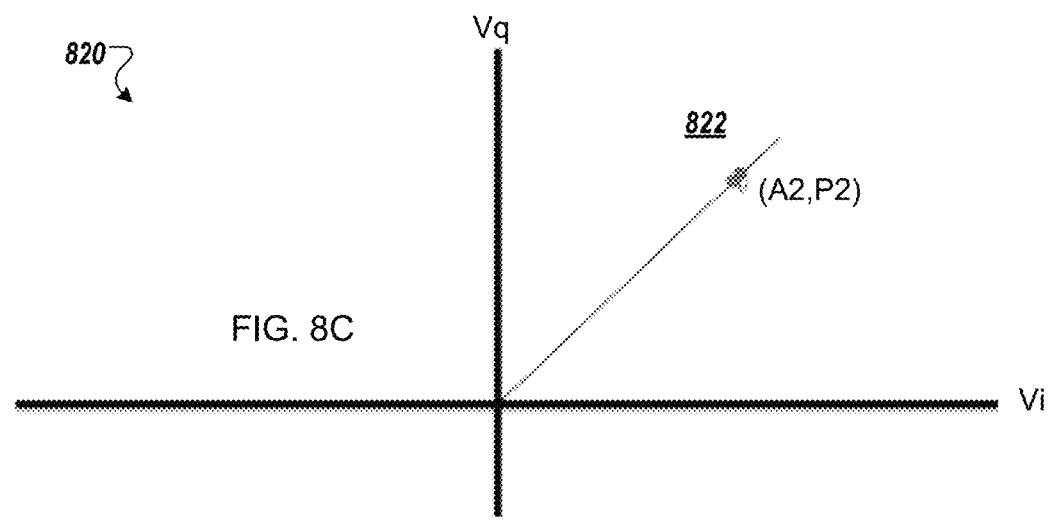
FIG. 8C is a graph illustrating a fourth search with a second amplitude resolution used in the AIC algorithm to further reduce the search space to determine the amplitude of the signal for cancellation according to one embodiment.

In a fourth stage, the processing logic performs a fourth search with a second amplitude resolution to further reduce the search space to determine the amplitude of the second signal. FIG. 8C is a graph 820 illustrating a fourth search 822 with a second amplitude resolution used in the AIC algorithm to further reduce the search space to determine the amplitude of the signal for cancellation according to one embodiment.

Figure 9A:
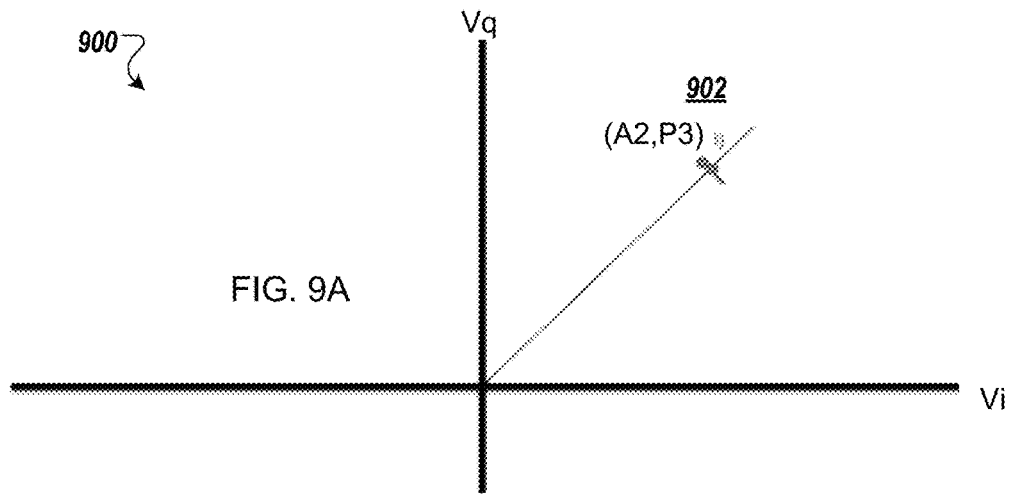
FIG. 9A is a graph illustrating a fifth search with a third phase resolution used in the AIC algorithm to further reduce the search space to determine the phase of the signal for cancellation according to one embodiment.

In a fifth stage, the processing logic performs a fifth search with a third phase resolution to further reduce the search space to determine the phase of the second signal. FIG. 9A is a graph 900 illustrating a fifth search 902 with a third phase resolution used in the AIC algorithm to further reduce the search space to determine the phase of the signal for cancellation according to one embodiment.

Figure 9B:
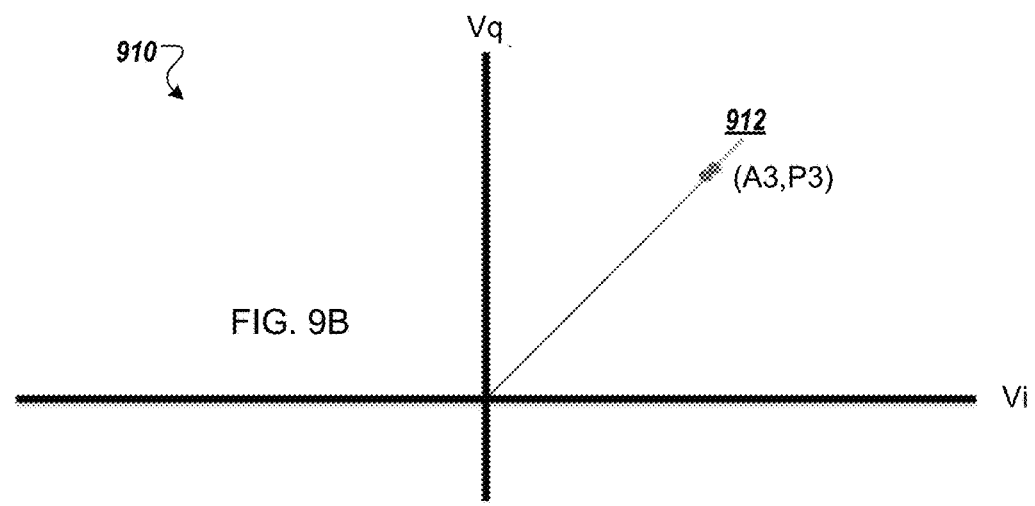
FIG. 9B is a graph illustrating a sixth search with a third amplitude resolution used in the AIC algorithm to further reduce the search space to determine the amplitude of the signal for cancellation according to one embodiment.

In a sixth stage, the processing logic performs a sixth search with a third amplitude resolution to further reduce the search space to determine the amplitude of the second signal FIG. 9B is a graph 910 illustrating a sixth search 912 with a third amplitude resolution used in the AIC algorithm to further reduce the search space to determine the amplitude of the signal for cancellation according to one embodiment.

In another embodiment, the processing logic sets a phase resolution to a first fixed value and determines a phase of the second signal with the phase resolution set to the first fixed value. The processing logic sets an amplitude resolution to a second fixed value and determines an amplitude of the second signal with the amplitude resolution set to the second fixed value. The processing logic sets the phase resolution to a third fixed value and determines the phase of the second signal with the phase resolution set to the third fixed value. The processing logic sets the amplitude resolution to a fourth fixed value and determines the amplitude of the second signal with the amplitude resolution set to the fourth fixed value. The processing logic sets the phase resolution to a fifth fixed value and determines the phase of the second signal with the phase resolution set to the fifth fixed value. The processing logic sets the amplitude resolution to a sixth fixed value and determines the amplitude of the second signal with the amplitude resolution set to the sixth fixed value.

In a further embodiment, the processing logic selects another value for the first programmable-delay filter to set a second delay in the cancellation path. With the second delay, the processing logic searches for the amplitude and the phase for the second RF signal that results in the minimum power by the third signal and selects the value for the first programmable-delay filter that sets a delay that is a closest match to the propagation delay in the antenna path. In one embodiment, the processing logic selects one of multiple individual delay paths using two single pole, N-throw (SPNT) switches, wherein N is a positive integer greater than one, and the multiple individual delay paths include lumped elements with different values that result in different delays in the individual delay paths.

In another embodiment with a MIMO antenna architecture, the processing logic instructs a third transceiver to transmit a fourth RF signal via a third antenna. The processing logic controls a second programmable-delay filter, disposed in a second cancellation path between the third transceiver and the second transceiver, to match a delay in the second cancellation path to a second propagation delay in a second antenna path between the third antenna and the second antenna. The second RF signal further includes interference caused by the fourth RF signal transmitted via the third antenna. The processing logic controls a second vector modulator, disposed in the second cancellation path, to generate a fifth RF signal by adjusting a phase, an amplitude or both of a copy of the fourth RF signal transmitted via the third antenna. The second signal and the fifth signal are combined by a two-way combiner and added to the third signal received via the second antenna to remove from the third RF signal interference caused by the first RF signal and fourth RF signal. That is the second RF coupler adds the third RF signal (with the fifth RF signal) to the second RF signal to removing the interference caused by the first RF signal transmitted via the first antenna and the interferences caused by the fourth signal transmitted via the third antenna.

Figure 10:
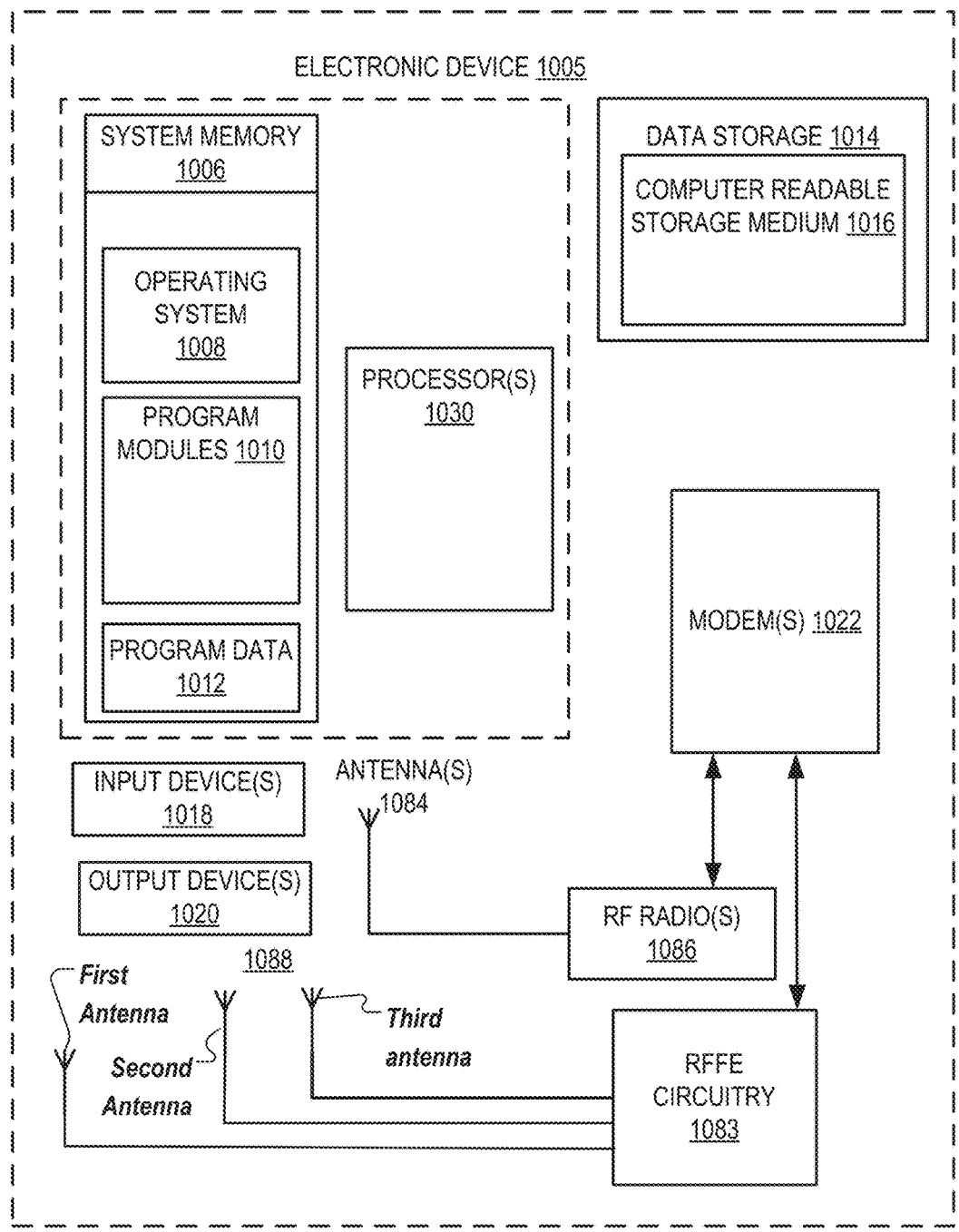
FIG. 10 is a block diagram of an electronic device in which embodiments of AIC may be implemented.

FIG. 10 is a block diagram of an electronic device 1005 in which embodiments of AIC may be implemented. The electronic device 1005 may correspond to the electronic device 10 of FIG. 1 of FIG. 1 or electronic device 10 of FIG. 2. The electronic device 1005 may be any type of computing device such as an electronic book reader, a PDA, a mobile phone, a laptop computer, a portable media player, a tablet computer, a camera, a video camera, a netbook, a desktop computer, a gaming console, a DVD player, a Bluray®, a computing pad, a media center, an audio-input-enabled device, a speech-based personal data assistant, and the like. The electronic device 1005 may be any portable or stationary user device. For example, the electronic device 1005 may be an intelligent voice control and speaker system. Alternatively, the electronic device 1005 can be any other device used in a WLAN network (e.g., Wi-Fi® network), a WAN network, or the like.

The electronic device 1005 includes one or more processor(s) 1030, such as one or more CPUs, microcontrollers, field programmable gate arrays, or other types of processing devices. The electronic device 1005 also includes system memory 1006, which may correspond to any combination of volatile and/or non-volatile storage mechanisms. The system memory 1006 stores information that provides operating system component 1008, various program modules 1010, program data 1012, and/or other components. In one embodiment, the system memory 1006 stores instructions of the methods as described herein. The electronic device 1005 performs functions by using the processor(s) 1030 to execute instructions provided by the system memory 1006.

The electronic device 1005 also includes a data storage device 1014 that may be composed of one or more types of removable storage and/or one or more types of non-removable storage. The data storage device 1014 includes a computer-readable storage medium 1016 on which is stored one or more sets of instructions embodying any of the methodologies or functions described herein. Instructions for the program modules 1010 may reside, completely or at least partially, within the computer-readable storage medium 1016, system memory 1006 and/or within the processor(s) 1030 during execution thereof by the electronic device 1005, the system memory 1006 and the processor(s) 1030 also constituting computer-readable media. The electronic device 1005 may also include one or more input devices 1018 (keyboard, mouse device, specialized selection keys, etc.) and one or more output devices 1020 (displays, printers, audio output mechanisms, etc.).

The electronic device 1005 further includes a modem 1022 to allow the electronic device 1005 to communicate via a wireless network (e.g., such as provided by the wireless communication system) with other computing devices, such as remote computers, an item providing system, and so forth. The modem 1022 can be connected to RFFE circuitry 1083 (including RF radios) and zero or more additional RF radios 1086. The RFFE circuitry 1083 may be a WLAN radio, a WAN radio, PAN radio, or the like, as described herein. Antennas 1088 are coupled to the RFFE circuitry 1083, which is coupled to the modem 1022. The antennas 1088 may include a first WLAN antenna and a second WLAN antenna, and PAN antenna as described herein. Zero or more antennas 1084 can be coupled to one or more RF radios 1086, which are also connected to the modem 1022. The zero or more antennas 1084 may be GPS antennas, NFC antennas, other WAN antennas, WLAN or PAN antennas, or the like. The modem 1022 allows the electronic device 1005 to handle both voice and non-voice communications (such as communications for text messages, multimedia messages, media downloads, web browsing, etc.) with a wireless communication system. The modem 1022 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1022 may generate signals and send these signals to antennas 1088, and 1084 via RFFE circuitry 1083, and RF radio(s) 1086 as descried herein. Electronic device 1005 may additionally include a WLAN radio, a GPS receiver, a PAN transceiver and/or other RF radios. These RF radios may additionally or alternatively be connected to one or more of antennas 1084, 1088. Antennas 1084, 1088 may be configured to transmit in different frequency bands and/or using different wireless communication protocols. The antennas 1084, 1088 may be directional, omnidirectional, or non-directional antennas. In addition to sending data, antennas 1084, 1088 may also receive data, which is sent to appropriate RF radios connected to the antennas.

In one embodiment, the electronic device 1005 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 1022 is shown to control transmission and reception via antenna (1084, 1088), the electronic device 1005 may alternatively include multiple modems, each of which is configured to transmit/receive data via a different antenna and/or wireless transmission protocol.

The electronic device 1005 delivers and/or receives items, upgrades, and/or other information via the network. For example, the electronic device 1005 may download or receive items from an item providing system. The item providing system receives various requests, instructions and other data from the electronic device 1005 via the network. The item providing system may include one or more machines (e.g., one or more server computer systems, routers, gateways, etc.) that have processing and storage capabilities to provide the above functionality. Communication between the item providing system and the electronic device 1005 may be enabled via any communication infrastructure. One example of such an infrastructure includes a combination of a wide area network (WAN) and wireless infrastructure, which allows a user to use the electronic device 1005 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by products using the Wi-Fi® technology based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the electronic device 1005.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The electronic devices 1005 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The electronic devices 1005 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. An apparatus comprising:
  a processing device; and
  radio frequency front-end (RFFE) circuitry coupled to the processing device, the RFFE circuitry comprising
    a vector modulator disposed along an electrical path between a transmit path to a first antenna and a receive path from a second antenna, wherein the processing device is operable to match a delay in the electrical path to a propagation delay in an antenna path, wherein the processing device is operable to control the vector modulator to adjust a phase, an amplitude or both of a copy of a first RF signal to generate a third RF signal that is added to a second RF signal received via the second antenna to remove interference caused by the first RF signal transmitted via the first antenna, wherein the processing device is operable to determine a phase and an amplitude for the third RF signal that results in a minimum power by the second RF signal by:
    setting a phase resolution to a first value;
    determining a first phase of the third RF signal with the phase resolution set to the first value;
    setting an amplitude resolution to a second value;
    determining a second amplitude of the third RF signal with the amplitude resolution set to the second value;
    setting the phase resolution to a third value;
    determining the phase of the third RF signal with the phase resolution set to the third value;
    setting the amplitude resolution to a fourth value;
    determining the amplitude of the third RF signal with the amplitude resolution set to the fourth value;
    setting the phase resolution to a fifth value;
    determining the phase of the third RF signal with the phase resolution set to the fifth value;
    setting the amplitude resolution to a sixth value; and
    determining the amplitude of the third RF signal with the amplitude resolution set to the sixth value.

2. The apparatus of claim 1, wherein the RFFE circuitry further comprises: a programmable-delay filter; and a balun coupled between the programmable-delay filter and the vector modulator.

3. The apparatus of claim 1, further comprising a first transceiver coupled to the transmit path and a second transceiver coupled to the receive path, wherein the first transceiver and the second transceiver operate in a same frequency spectrum concurrently without time-switching, and wherein the first transceiver and the second transceiver operate concurrently in the 2.4 GHz industrial, scientific and medical (ISM) radio band.

4. The apparatus of claim 1, further comprising a first transceiver coupled to the transmit path and a second transceiver coupled to the receive path, wherein the first transceiver is at least one of a wireless local area network (WLAN) transceiver, a wide area network (WAN) transceiver, or a personal area network (PAN) transceiver, and wherein the second transceiver is at least one of a WLAN transceiver, a WAN transceiver, or a PAN transceiver.

5. The apparatus of claim 1, further comprising a programmable-delay filter, wherein the programmable-delay filter comprises:
  a first single pole, N-throw (SPNT) switch, where N is a positive integer greater than one;
  a second SPNT switch; and
  a plurality of lumped elements disposed in individual delay paths between the first SPNT and the second SPNT, wherein the plurality of lumped elements comprise different values to result in different delays in the individual delay paths.

6. The apparatus of claim 1, wherein the RFFE circuitry further comprises:
  a first RF coupler coupled between the first antenna and a first transceiver in the transmit path, the first RF coupler to create a copy of the first RF signal transmitted via the first antenna;
  a second RF coupler coupled between the second antenna and a second transceiver in the receive path, the second antenna to receive the second RF signal, the second RF signal comprising interference caused by the first RF signal transmitted via the first antenna;
  a programmable-delay filter disposed along the electrical path between the first RF coupler and the second RF coupler;
  a third RF coupler coupled between a third antenna and a third transceiver in a second transmit path, the third RF coupler to create a copy of a fourth RF signal transmitted via the third antenna;
  a second programmable-delay filter disposed along a second electrical path between the third RF coupler and the second RF coupler, the second RF signal further comprising interference caused by the fourth RF signal transmitted via the third antenna;
  a second vector modulator disposed along the second electrical path between the third RF coupler and a two-way combiner, wherein the processing device is operable to control the second vector modulator to adjust a phase, an amplitude or both of the copy of the fourth RF signal to generate a fifth RF signal; and
  the two-way combiner coupled to the second vector modulator, the vector modulator, and the second RF coupler, the two-way combiner to combine the fifth RF signal to the third RF signal, and wherein the second RF coupler adds the third RF signal to the second RF signal received via the second antenna, removing the interference caused by the first RF signal transmitted via the first antenna and the interference caused by the fourth RF signal transmitted via the third antenna.

7. The apparatus of claim 6, further comprising a bypass circuit comprising:
   a first single pole, double throw (SPDT) switch coupled to the second transceiver; and
   a second SPDT switch coupled to the second antenna, wherein a first terminal of the first SPDT switch is coupled to the two-way combiner via the second RF coupler, wherein a first terminal of the second SPDT switch is coupled to the second RF coupler, and wherein a second terminal of the first SPDT switch is coupled to a second terminal of the second SPDT switch.

8. The apparatus of claim 6, wherein the processing device is operable to control the programmable-delay filter to select a phase delay of the copy of the first RF signal and the second programmable-delay filter to select a phase delay of the copy of the fourth RF signal during operation based on an antenna environment of the first antenna, second antenna, and third antenna and to control the vector modulator to adjust the phase, the amplitude or both of the copy of the first RF signal and the second vector modulator adjust the phase, the amplitude or both of the copy of the fourth RF signal.

9. The apparatus of claim 8, wherein the processing device is operable to adjust parameters of the RFFE circuitry to accommodate changes in the antenna environment.

10. A method comprising:
    instructing, by a processing device, a first transceiver to transmit a first radio frequency (RF) signal via a first antenna;
    instructing, by the processing device, a second transceiver to receive a second RF signal via a second antenna, the second RF signal includes interference from the first RF signal transmitted through an antenna path from the first antenna to the second antenna;
    controlling, by the processing device, a first programmable-delay filter, disposed in an electrical path between the first transceiver and the second transceiver, to match a delay in the electrical path to a propagation delay in the antenna path;
    determining, by the processing device, an amplitude and a phase for a third RF signal that result in a minimum power by the second RF signal by iteratively determining the phase of the third RF signal using a phase resolution set to a first plurality of values, one value at a time, and by iteratively determining the amplitude of the third RF signal using an amplitude resolution set to a second plurality of values, one value at a time; and
    controlling, by the processing device, a first vector modulator, disposed in the electrical path, to generate the third RF signal by adjusting a phase, an amplitude or both of a copy of a first RF signal transmitted via the first antenna such that the third RF signal comprises the amplitude and the phase determined by the processing device, wherein the third RF signal is added to the second RF signal received via the second antenna to remove the interference from the first RF signal.

11. The method of claim 10, further comprising:
    selecting, by the processing device, one of a plurality of values for the first programmable-delay filter to set a first delay of the electrical path; and
    determining, by the processing device, an amplitude and a phase for the third RF signal that result in a minimum power by the second RF signal.

12. The method of claim 11, wherein determining the amplitude and phase comprises:
    setting a first amplitude value and a first phase value;
    generating the third RF signal having the first amplitude value and the first phase value;
    measuring a power of the second RF signal; and
    adjusting the first amplitude value, the first phase value, or both to find the minimum power by the second RF signal.

13. The method of claim 11, further comprising selecting, by the processing device, one of a plurality of individual delay paths using a first single pole, N-throw (SPNT) switch, wherein N is a positive integer greater than one, and wherein the plurality of individual delay paths comprises lumped elements with different values that result in different delays in the plurality of individual delay paths.

14. The method of claim 10, further comprising:
    instructing, by the processing device, a third transceiver to transmit a fourth RF signal via a third antenna;
    controlling, by the processing device, a second programmable-delay filter, disposed in a second electrical path between the third transceiver and the second transceiver, to match a delay of the second electrical path to a second propagation delay of a second antenna path between the third antenna and the second antenna; and
    controlling, by the processing device, a second vector modulator, disposed in the second electrical path, to generate a fifth RF signal by adjusting a phase, an amplitude or both of a copy of the fourth RF signal transmitted via the third antenna, wherein the third RF signal and the fifth RF signal are combined by a two-way combiner and added to the second RF signal received via the second antenna to remove from the second RF signal interference caused by the first RF signal and fourth RF signal.

15. A method comprising:
    instructing, by a processing device, a first transceiver to transmit a first radio frequency (RF) signal via a first antenna;
    instructing, by the processing device, a second transceiver to receive a second RF signal via a second antenna, the second RF signal includes interference from the first RF signal transmitted through an antenna path from the first antenna to the second antenna;
    matching, by the processing device, a delay in an electrical path between the first transceiver and the second transceiver to a propagation delay in the antenna path;
    controlling, by the processing device, a first vector modulator, disposed in the electrical path, to generate a third RF signal by adjusting a phase, an amplitude or both of a copy of a first RF signal transmitted via the first antenna, wherein the third RF signal is added to the second RF signal received via the second antenna to remove the interference from the first RF signal; and
    determining, by the processing device, an amplitude and a phase for the third RF signal that result in a minimum power by the second RF signal, wherein the determining the amplitude and the phase comprises:
    setting a phase resolution to a first value;
    determining a phase of the third RF signal with the phase resolution set to the first value;
    setting an amplitude resolution to a second value;
    determining an amplitude of the third RF signal with the amplitude resolution set to the second value;
    setting the phase resolution to a third value;
    determining the phase of the third RF signal with the phase resolution set to the third value;

setting the amplitude resolution to a fourth value;
determining the amplitude of the third RF signal with the amplitude resolution set to the fourth value;
setting the phase resolution to a fifth value;
determining the phase of the third RF signal with the phase resolution set to the fifth value;
setting the amplitude resolution to a sixth value; and
determining the amplitude of the third RF signal with the amplitude resolution set to the sixth value.

16. The method of claim 15, further comprising:
selecting, by the processing device, a first value of a plurality of values for a first programmable-delay filter to set a first delay of the electrical path;
selecting, by the processing device, a second value of the plurality of values for the first programmable-delay filter to set a second delay of the electrical path;
searching, by the processing device, for the amplitude and the phase for the third RF signal that results in the minimum power by the second RF signal; and
selecting, by the processing device, the first value or the second value for the first programmable-delay filter that sets a delay that is a closest match to the propagation delay of the antenna path.

* * * * *